United States Patent [19]

Shibata et al.

[11] Patent Number: 5,246,983
[45] Date of Patent: Sep. 21, 1993

[54] UNSATURATED POLYESTER RESIN COMPOSITIONS, MOLDING COMPOUNDS AND MOLDED PRODUCTS THEREFROM

[75] Inventors: Takashi Shibata, Toyono; Hiromu Miyashita, Suita; Sanzi Aoki, Kitakatsuragi; Koichi Akiyama, Osaka, all of Japan

[73] Assignee: Takeda Chemical Industries, Ltd., Osaka, Japan

[21] Appl. No.: 717,818

[22] Filed: Jun. 19, 1991

[30] Foreign Application Priority Data

Jun. 27, 1990 [JP] Japan .................................. 2-169088

[51] Int. Cl.$^5$ .............................................. C08J 9/32
[52] U.S. Cl. .................................. 523/219; 523/218; 523/513; 523/527; 524/494
[58] Field of Search ................ 523/219, 218, 513, 527; 524/494

[56] References Cited

U.S. PATENT DOCUMENTS 4,020,036  4/1977  South, Jr. ...................... 260/40 R
4,692,480  9/1987  Takahashi et al. ................ 523/218

FOREIGN PATENT DOCUMENTS 64-48812   2/1989  Japan .
64-54057   3/1989  Japan .
1-315458  12/1989  Japan .

OTHER PUBLICATIONS

Potter Industries, Ltd., Bulletin Re Sphericel TM.

Primary Examiner—Paul R. Michl
Assistant Examiner—U. K. Rajguru
Attorney, Agent, or Firm—Wenderoth, Lind & Ponack

[57] ABSTRACT

A resin composition comprising (a) an unsaturated polyester, (b) a vinyl monomer, (c) a thermoplastic resin, (d) a curing agent and (e) a hollow filler with a number average particle diameter of not more than 20 $\mu$, wherein (e) occurs in a proportion of 10 to 150 parts by weight to 100 parts by weight of (a), (b) and (c) combined, and the molding compounds obtainable by impregnating glass fiber with the said resin composition are very useful in that, because of their lower specific gravity, they provide lightweight products with excellent surface quality which are great use as automotive exterior body panels and other parts.

16 Claims, 1 Drawing Sheet

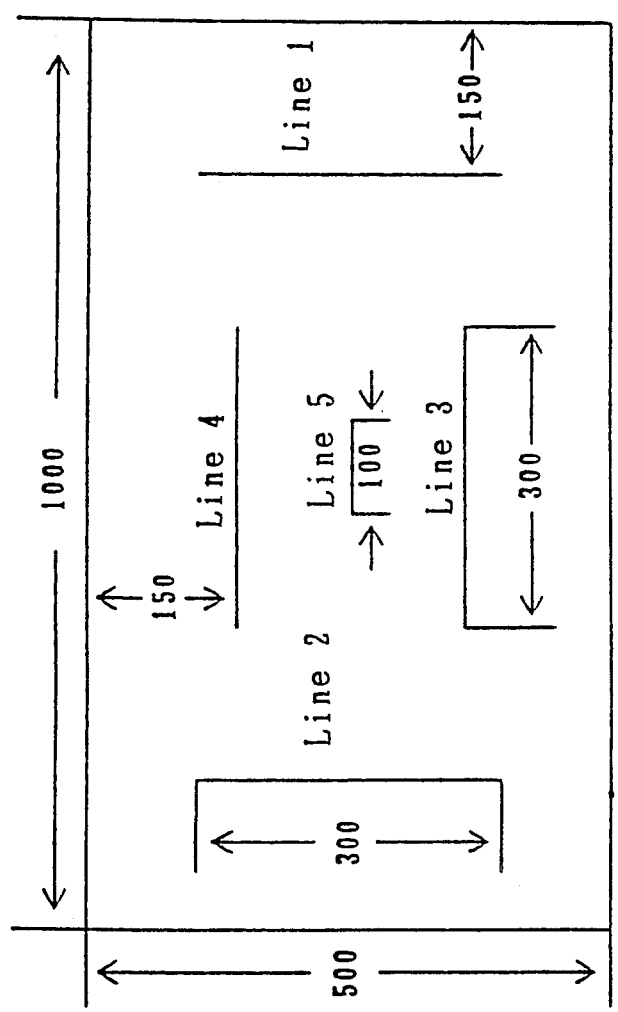
FIGURE

UNSATURATED POLYESTER RESIN COMPOSITIONS, MOLDING COMPOUNDS AND MOLDED PRODUCTS THEREFROM

Field of the Invention

The present invention relates to a high surface quality, lightweight unsaturated polyester resin composition, a sheet or bulk molding compound comprising a glass fiber impregnated with said resin composition and a novel molded product obtainable from said compound, which are useful for a variety of applications such as automotive exterior body panels and parts.

Fiber reinforced plastics (FRP) based on unsaturated polyester resin are not only excellent in mechanical strength, heat resistance, water resistance and resistance to chemicals but also high in productivity and, therefore, have been used broadly in such applications as bathtubs, water tank panels, sinks and so on. Recently, sheet molding compounds (hereinafter referred to briefly as SMC) and bulk molding compounds (hereinafter briefly as BMC) in the unsaturated polyester have been widely used as plastic materials for automotive exterior body panels, for example, engine hoods, car roofs, trunk lids, etc. and other exterior parts such as spoilers, air intakes, rocker panels and so on.

While the SMC and BMC for automotive exterior body panels are required to have such characteristics as high surface quality, fast curing property and high productivity, recent years have witnessed an additional demand for reduced weight of the material itself.

An approach to weight reduction is to cut down on the proportion of the filler or glass fiber in the molding compound but this practice generally sacrifices the surface quality of molded parts and causes marked decreases in mechanical properties (e.g. strength, modulus, etc.).

On the other hand, it is also a known practice to lower the specific gravity of molded products by using a lightweight filler represented by silas or glass microballoon (hereinafter referred to briefly as GMB) but the commercial GMB leads to a poor surface quality of parts and formation of blisters on painting or in the water resistance test, thus being unsuited for use in certain applications such as automotive exterior body panels and exterior parts.

It is also known, for the purpose of improving the surface smoothness of molded products, to incorporate a thermoplastic resin, such as poly(methyl methacrylate), poly(vinyl acetate), styrene-butadiene block polymer, saturated polyester or the like. (e.g. Japanese Kokai Tokkyo Koho No. 52-148588). However, with the conventional lightweight fillers commonly used in the molding compounds, not only the long-term waviness of molded products is accentuated but the short-term waviness (surface roughness) is markedly increased. Therefore, these fillers cannot be used in applications demanding high surface quality such as automotive exterior body panels.

The intensive exploration into molding materials that should meet such requirements led the inventors of the present invention to the following findings.

Thus, (1) the conventional lightweight filler has a particle size distribution extending over a range of about 0 to about $200\mu$ with a peak at about $50$–$60\mu$. The use of such filler has the following drawbacks. i) In the production of an SMC, the lightweight filler is filtered through the glass fiber to cause localization of the respective lightweight filler, glass fiber and resin components. ii) In the molding process, the lightweight filler, glass fiber and resin do not flow uniformly, tending to result in the localization of the lightweight filler on the surface of products, so that the surface smoothness of products is sacrificed.

(2) The surface of molded products must have a smoothness of the order of microns but since the particle size of the conventional lightweight filler exceeds about $50\mu$ in many instances, it tends to be localized to seriously affect the surface smoothness of the product.

(3) As the localized masses of lightweight filler collide with each other in the course of flow in the mold, they are subjected to high shear forces to sustain damage and cause blisters upon painting.

(4) The lightweight filler localized on the product surface may cause chipping of the product in the trimming and finishing operation or give rise to blisters in the painting process.

(5) Furthermore, the lightweight filler, particularly GMB, contains free alkali in many instances and in the water resistance testing of the product, much water tends to be adsorbed on the filler surface by way of osmosis. Continued release of alkali from the filler ushers in further water, with the result that cracks due to expansion due to the absorption of water tend to take place where the lightweight filler is localized.

Based on the above findings, the inventors of the present invention conducted further investigation and found that when a filler having a hollow structure with a number average particle size of not more than $20\mu$ is employed, there occurs substantially no localization to insure a satisfactory surface characteristic and a freedom from the incidence of blisters at painting and water test cracks. The above finding was followed by further research which has culminated in the present invention.

BRIEF DESCRIPTION OF THE FIGURE

The FIGURE shows a flat panel press-molded from about molding compounds of the present invention, and how the surface characteristics of the panel were measured by a three-dimensional coordinate measuring machine.

DETAILED DESCRIPTION OF THE INVENTION

Thus, the present invention relates to a resin composition comprising (a) an unsaturated polyester, (b) a vinyl monomer, (c) a thermoplastic resin, (d) a curing agent and (e) a hollow filler with a number average particle diameter of not more than $20\mu$, wherein (e) occurs in a proportion of 10 to 150 parts by weight to 100 parts by weight of (a), (b) and (c) combined, a molding compound comprising a glass fiber impregnated with said resin composition, and a molded product obtained by curing of said molding compound.

The resin composition according to the present invention has such a low specific gravity that the product available on curing a molding compound comprising the same and a glass fiber is not only very light in weight but excellent in surface smoothness (substantial freedom from sink marks at the rib and boss, waviness, surface roughness, etc.) and high water resistance. Therefore, it is particularly useful for the manufacture of automotive exterior body panels and other exterior parts.

The unsaturated polyester (a) to be employed in the present invention is synthesized from an α,β-olefinic unsaturated dicarboxylic acid and a divalent glycol by condensation reaction and, as such, is well known. In the synthesis of such polyester, saturated dicarboxylic acids, aromatic dicarboxylic acids or dicyclopentadiene reactive with dicarboxylic acids can also be employed in addition to said two starting materials. Examples of the α,β-olefinic unsaturated dicarboxylic acid include, inter alia, maleic acid, fumaric acid, itaconic acid, citraconic acid, etc. and the corresponding anhydrides. Examples of said dicarboxylic acid which may be used together with such an α,β-olefinic unsaturated dicarboxylic acid include, inter alia, adipic acid, sebacic acid, succinic acid, gluconic acid, phthalic anhydride, o-phthalic acid, isophthalic acid, terephthalic acid, tetrahydrophthalic acid, tetrachlorophthalic acid and so on. The divalent glycol includes, inter alia, alkanediols, oxaalkanediols, and other diols such as the adduct of ethylene oxide, propylene oxide or the like to bisphenol A. Monools and triols may also be additionally employed. The alkanediols include ethylene glycol, 1,2-propylene glycol, 1,3-propylene glycol, 1,3-butanediol, 1,4-butanediol, neopentyl glycol, 1,5-pentanediol, 1,6-hexanediol, cyclohexanediol and so on. The oxaalkanediols include dioxyethylene glycol, trioxyethylene glycol and so on. The mono- or tri-hydric alcohol which can be used in combination with such glycols include octyl alcohol, oleyl alcohol, trimethylolpropane and so on. The synthesis of such an unsaturated polyester is generally conducted under heating, with the by-product water being constantly removed from the reaction system. In the present invention, an unsaturated polyester with a number average molecular weight of 800 to 4,000 and an acid value of 20 to 60 is generally employed.

The vinyl monomer (b) to be employed in the present invention includes the monovinyl monomers which are conventionally used as diluents or crosslinking agents for the polyester (a), e.g. aromatic monovinyl monomers such as styrene, p-chlorostyrene, vinyltoluene, etc. and acrylic monovinyl monomers such as acrylic acid, methyl acrylate, methacrylic acid, methyl methacrylate, acrylonitrile and so on. Particularly preferred is styrene. This component (b) is generally incorporated in component (a) and (c) as a diluent for (a) and (c).

The thermoplastic resin (c) to be employed in the present invention can be any of those thermoplastic resins which are conventionally used as low profile agents for unsaturated polyesters. Among such resins are polybutadiene or its hydrogenation product, polyisoprene or its hydrogenation product, aromatic vinyl/conjugated diene block copolymer or its hydrogenation product, polystyrene, styrene/vinylacetate block copolymer, polyvinyl acetate, polymethyl methacrylate and so on. In addition, saturated polyesters (mol. wt. 3,000 to 100,000), polyethers, etc. can also be mentioned. The aromatic vinyl/conjugated diene block copolymer mentioned just above is a per se known polymer and can be synthesized by block copolymerization using an aromatic vinyl monomer, such as styrene, chlorostyrene, vinyltoluene or the like, and a conjugated diene monomer, such as butadiene, isoprene or the like. Examples of such block copolymer include styrene/butadiene block copolymer, styrene/isoprene block copolymer and so on. The copolymer to be used in the present invention preferably has a mole ratio of vinyl monomer to diene monomer in the range of approximately 50:50 through 5:95 and a number average molecular weight in the range of approximately 30,000 to 200,000.

The thermoplastic resin to be used in the present invention may be carboxyl-modified. Thus, said polymer so carboxyl-modified will have an improved compatibility with the unsaturated polyester and, in the preparation of an SMC or BMC, may contribute to the increased thickening of the compound by magnesium oxide.

The resin composition of the present invention has, by virtue of said components (a), (b) and (c), a very satisfactory surface characteristic. Particularly, the formulation of 20 to 40 parts by weight, preferably 25 to 35 parts by weight, of component (a), 30 to 70 parts by weight, preferably 40 to 55 parts by weight, of component (b) and 10 to 30 parts by weight, preferably 10 to 25 parts by weight, of component (c), to make a total of 100 parts by weight, is very satisfactory and useful.

The curing agent (d) to be employed in accordance with the present invention includes, inter alia, peroxy esters such as t-butyl peroxybenzoate, t-butyl peroxyoctoate, etc., peroxyketals such as 1,1-bis(t-butyl-peroxy)-3,3,5-trimethylcyclohexane etc., and peroxycarbonates such as t-butyl peroxyisopropylcarbonate and so on. Of these compounds, at least one is used in a proportion of 0.5 to 5 parts by weight, preferably 1 to 3 parts by weight, to 100 parts by weight of (a), (b) and (c) combined. Particularly preferred is peroxyester.

For expediting the cure of the resin, a promoter (for example, an organometal salt of cobalt) as described in Japanese Kokai Tokkyo Koho No. 1-315458 may be used in combination with said curing agent.

The hollow filler (e) to be used in the present invention is a hollow filler with a number average particle diameter of not more than $20\mu$, preferably not more than $10\mu$. It is preferably of the independent cell structure. It has a particle size distribution extending over a range of not more than $200\mu$, preferably not more than $100\mu$, more preferably not more than $50\mu$. Examples of such hollow filler include hollow structures of GMB, silas, ceramics or organic materials. Particularly preferred are hollow structures of GMB.

The amount of such hollow filler relative to 100 parts by weight of (a), (b) and (c) combined is 10 to 150 parts by weight and preferably 20 to 120 parts by weight. As any level below 10 parts by weight, molded product are not sufficiently light in weight, while the use of (e) in excess of 150 parts by weight tends to detract from the surface characteristic of products.

In order to insure an improved compatibility of the hollow filler with the unsaturated polyester and suppress release of the alkaline metal from the hollow filler, the filler may be previously surface-treated with a silane coupling agent, acrylic resin, polyvinyl acetate, polyurethane, polyester or the like.

Where necessary, the resin composition of the present invention may contain other fillers than said hollow fillers, inhibitors, pigments, thickeners and other additives. Among such fillers are calcium carbonate, talc, silica, clay, glass powder and so on. The inhibitors may be p-benzoquinone, t-butylcatechol and so on. Among the pigments mentioned above are titanium dioxide, carbon black, rouge, phthalocyanine blue and so on. The thickeners may for example be oxides and hydroxides of magnesium, calcium and so on.

The resin composition containing such components can be used to impregnate a glass fiber (for example, made up of fibers about 8-20μ in diameter and ½-4 inches long) using the conventional technique and apparatus to provide an SMC or BMC. The glass fiber content is generally about 10 to 40 weight percent based on the total composition. The SMC or BMC according to the present invention can be molded into a final product using a mold at elevated temperature and pressure (pressure 50-120 kgf/cm², temperature 110°-180° C.).

The resin composition and the molding compounds obtainable by impregnating glass fiber with the resin composition in accordance with the present invention are very useful in that, because of their lower specific gravity, they provide lightweight molded products with excellent surface quality and the molded products coated with a paint has also very satisfactory blistering resistance to water. The molded products obtainable from the said compositions are of great use as automotive exterior body panels and other parts.

PREFERRED EMBODIMENTS OF THE INVENTION

The following examples are further illustrative of the invention.

70 parts by weight of styrene, and had viscosity of 28,000 cps at 25° C. This copolymer had average molecular weight of 120,000, styrene content of 15 weight % and butadiene content of 85 weight % and contained 0.5 weight % of carboxyl groups. Each SMC was press-molded at a flow time of 9 seconds and a pressure of 80 kgf/cm² to fabricate a flat panel (of dimentions 500×1000×2 mm) as illustrated in FIGURE.

The surface characteristic of each product was tested by means of a three-dimensional coordinate measuring machine (Microcord FJ 604, Mitsutoyo). First, the surface measurement (X, Y, Z) at 300 points was performed along line 1 to line 4 at a pitch of 1.0 mm. To find the sectional shape, a fifth power regression curve was determined from the Z values of respective points and the mean deviation was calculated from this curve and the Z values of respective points. The surface roughness was determined by measurement along line 5. The results are set forth in Table 1.

It is apparent from Table 1 that the SMC-molded panels of the present invention are lower in specific gravity and superior in surface quality and blistering resistance to water than the products of Comparative Examples 1-6.

TABLE 1

| | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| 1) Formula (parts by weight) | | | | | | | | | | | | | |
| a) | Unsaturated polyester A | 35 | 35 | 35 | 35 | — | 35 | 35 | 35 | 35 | 35 | 35 | 35 |
| | Unsaturated polyester B | — | — | — | — | 32.5 | — | — | — | — | — | — | — |
| b) | Styrene | 50 | 50 | 50 | 50 | 47.5 | 45 | 50 | 50 | 50 | 50 | 50 | 50 |
| c) | Styrene/butadiene copolymer | 15 | 15 | 15 | 15 | 15 | — | 15 | 15 | 15 | 15 | 15 | 15 |
| | Polyvinyl acetate | — | — | — | — | — | 20 | — | — | — | — | — | — |
| d) | t-Butyl peroxybenzoate | 2 | 2 | 2 | 2 | 2 | 2 | 2 | 2 | 2 | 2 | 2 | 2 |
| e) | Glass microballoon A | 140 | 80 | 50 | — | 80 | 80 | — | — | — | 200 | 5 | — |
| | Glass microballoon B | — | — | — | 15 | — | — | — | — | — | — | — | — |
| | Glass microballoon C | — | — | — | — | — | — | 50 | 30 | — | — | — | — |
| | Glass microballoon D | — | — | — | — | — | — | — | — | 80 | — | — | — |
| f) | Calcium carbonate | 20 | 70 | 90 | 120 | 70 | 70 | 90 | 120 | 70 | 0 | 195 | 200 |
| g) | Magnesium oxide | 1 | 1 | 1 | 1 | 1 | 1 | 1 | 1 | 1 | 1 | 1 | 1 |
| h) | Glass fiber (13μ dia., 1" long) | 30 | 30 | 30 | 30 | 30 | 30 | 30 | 30 | 30 | 30 | 30 | 30 |
| 2) Physical properties of molded panel | | | | | | | | | | | | | |
| a) | Specific gravity | 1.34 | 1.52 | 1.63 | 1.61 | 1.52 | 1.52 | 1.41 | 1.60 | 1.52 | 1.27 | 1.97 | 1.99 |
| b) | Surface properties | | | | | | | | | | | | |
| | Average deviation from fifth power regression (μ) | 3.2 | 2.1 | 1.8 | 1.7 | 2.3 | 2.8 | 6.1 | 5.4 | 11.9 | 6.5 | 1.9 | 1.8 |
| | Surface roughness (μ) | 1.7 | 1.3 | 0.9 | 1.3 | 1.2 | 0.7 | 5.8 | 4.2 | 7.6 | 4.2 | 1.0 | 0.8 |
| c) | Blisters | | | | | | | | | | | | |
| | Molded panel | 0 | 0 | 0 | 0 | 0 | 0 | 10 | 5 | 18 | 0 | 0 | 0 |
| | Painted panel | 0 | 0 | 0 | 0 | 0 | 0 | 21 | 8 | 29 | 0 | 0 | 0 |

Notes
Number average particle diameter and a range of a particle size distribution of glass microballoon A = 10μ, 0-50μ (specific gravity: 1.0), B = 18μ, 0-40μ (specific gravity: 0.4), C = 40μ, 0-200μ, D = 60μ, 0-200μ
Blisters: Each molded panel, 300 × 300 mm and 2.5 mm thick, is immersed in water at 40° C. for 240 hours and the number of blisters is counted.
Painted panel: Each molded panel is painted with a two-component urethane paint, dried at 140° C. for 30 minutes, and tested.

EXAMPLES 1 to 6 and COMPARATIVE EXAMPLES 1 to 6

Sheet molding compounds were prepared in accordance with the formulation indicated in Table 1. Referring to Table 1, the unsaturated polyester A was synthesized from propylene glycol and maleic acid, and the unsaturated polyester resin having viscosity of 820 cps at 25° C. and acid value of 16.5 was obtained by adding styrene to the unsaturated polyester B. The unsaturated polyester B was synthesized from 0.7 mole of propylene glycol, 0.3 mole of dicyclopentadiene and 1.0 mole of maleic anhydride, and the unsaturated polyester resin having a viscosity of 650 cps at 25° C. and acid value of 21 by additing styrene to the unsaturated polyester B. The styrene-butadiene block copolymer solution was composed of 30 parts by weight of the copolymer and

What is claimed is:

1. A resin composition comprising (a) an unsaturated polyester, (b) a vinyl monomer, (c) a thermoplastic resin, (d) a curing agent and (e) a glass microballoon with a number average particle diameter of not more than 20μ wherein (e) is present in a proportion of 10 to 150 parts by weight to 100 parts by weight of (a), (b) and (c) combined.

2. The resin composition of claim 1, wherein (e) is present in a proportion of 20 to 120 parts by weight of (a), (b) and (c) combined.

3. The resin composition of claim 1, wherein (e) has a number average particle diameter of not more than 10μ.

4. The resin composition of claim 1, wherein (e) has a particle size distribution extending over a range of not more than 200μ.

5. The resin composition of claim 1, wherein (e) has a particle size distribution extending over a range of not more than 100μ.

6. The resin composition of claim 1, wherein (e) has a particle size distribution extending over a range of not more than 50μ.

7. The resin composition of claim 1, wherein the proportion of (a) is 20 to 40 parts by weight, the proportion of (b) is 30 to 70 parts by weight and the proportion of (c) is 10 to 30 parts by weight to 100 parts by weight of (a), (b) and (c) combined.

8. The resin composition of claim 1, wherein the proportion of (a) is 25 to 35 parts by weight, the proportion of (b) is 40 to 55 parts by weight and the proportion of (c) is 10 to 25 parts by weight to 100 parts by weight of (a), (b) and (c) combined.

9. The resin composition of claim 1, wherein (b) is styrene.

10. The resin composition of claim 1, wherein (c) is styrene/butadiene copolymer or polyvinyl acetate.

11. The resin composition of claim 1, wherein (d) is a peroxy ester.

12. The resin composition of claim 1, wherein (d) is t-butyl peroxybenzoate.

13. The resin composition of claim 1, wherein the proportion of (d) is 0.5 to 5 parts by weight to 100 parts, by weight of (a), (b) and (c) combined.

14. The resin composition of claim 1, wherein the proportion of (d) is 1 to 3 parts by weight to 100 parts by weight of (a), (b) and (c) combined.

15. A molding compound comprising glass fiber and a resin composition, said composition comprises (a) an unsaturated polyester, (b) a vinyl monomer, (c) a thermoplastic resin, (d) a curing agent and (e) a glass microballoon with a number average particle diameter of not more than 20μ, wherein (e) is present in a proportion of 10 to 150 parts by weight to 100 parts by weight of (a), (b) and (c) combined.

16. A molded product obtainable by curing a molding compound comprising glass fiber and a resin composition, said composition being comprised of (a) an unsaturated polyester, (b) a vinyl monomer, (c) a thermoplastic resin, (d) a curing agent and (e) a glass microballoon with a number average particle diameter of not more than 20μ, wherein (e) is present in a proportion of 10 to 150 parts by weight to 100 parts by weight of (a), (b) and (c) combined.

* * * * *